United States Patent
Culp et al.

(10) Patent No.: US 7,306,152 B2
(45) Date of Patent: Dec. 11, 2007

(54) IDENTIFICATION OF UNITS IN CUSTOMIZED PRODUCTION

(75) Inventors: James C. Culp, Pleasanton, CA (US); Kwan Ho, Milpitas, CA (US); Shiva Prasad Sambu, Mountain View, CA (US); Srinivas Kaza, San Francisco, CA (US); Craig E. Farren, Livermore, CA (US); Samuel J. Kass, Santa Clara, CA (US); Sergey Nikolsky, Moscow (RU)

(73) Assignee: Align Technology, Inc., Santa Clara, CA (US)

( * ) Notice: Subject to any disclaimer, the term of this patent is extended or adjusted under 35 U.S.C. 154(b) by 0 days.

(21) Appl. No.: 11/253,488

(22) Filed: Oct. 18, 2005

(65) Prior Publication Data

US 2006/0102725 A1   May 18, 2006

Related U.S. Application Data

(63) Continuation of application No. 10/986,626, filed on Nov. 12, 2004, now Pat. No. 6,976,627.

(51) Int. Cl.
*G06K 7/10* (2006.01)

(52) U.S. Cl. ............................................. 235/462.01
(58) Field of Classification Search ........... 235/462.01; 264/401
See application file for complete search history.

(56) References Cited

U.S. PATENT DOCUMENTS

| | | | |
|---|---|---|---|
| 6,227,851 B1 * | 5/2001 | Chishti et al. | 433/24 |
| 6,499,997 B2 * | 12/2002 | Chishti et al. | 433/24 |
| 6,508,971 B2 | 1/2003 | Leyden et al. | |
| 6,582,197 B2 * | 6/2003 | Coulson | 416/241 R |
| 6,648,640 B2 | 11/2003 | Rubbert et al. | |
| 2003/0024679 A1 * | 2/2003 | Cantwell | 164/98 |
| 2004/0107080 A1 * | 6/2004 | Deichmann et al. | 703/6 |
| 2005/0082703 A1 * | 4/2005 | Wrosz | 264/16 |

\* cited by examiner

*Primary Examiner*—Daniel Stcyr
*Assistant Examiner*—April Taylor
(74) *Attorney, Agent, or Firm*—Klein, O'Neill & Singh, LLP; Howard J. Klein

(57) ABSTRACT

Systems and methods are disclosed for identifying a mass-customized part by encoding a part identification into a multi-dimensional bar code; and using a stereolithography apparatus (SLA) to make the part with multi-dimensional bar code embedded therein.

23 Claims, 2 Drawing Sheets

IDENTIFICATION OF UNITS IN CUSTOMIZED PRODUCTION

CROSS-REFERENCE TO RELATED APPLICATIONS

This application is a continuation of U.S. patent application Ser. No. 10/986,626, filed Nov. 12, 2004, now U.S. Pat. No. 6,976,627, which is hereby incorporated by reference in its entirety.

BACKGROUND OF THE INVENTION

A. Field of the Invention

This invention relates to the manufacture of mass customized items, and more particularly to automated manufacturing processes of the same.

B. Description of the Related Art

Bar code symbol is a coded pattern of indicia comprising a series of adjacent bars and spaces of various widths. The bars and spaces have different light reflecting characteristics. A number of different bar code standards or symbologies exist. These symbologies include, for example, UPC/EAN, Code 128, Codabar, and Interleaved 2 of 5. The readers and scanning systems electro-optically decode each symbol to produce multiple alphanumerical characters that are intended to be descriptive of the article or some characteristic thereof. Such characters are typically represented in digital form as an input to a data processing system for applications in point-of-sale processing, inventory control, and the like.

Ordinary bar code is "vertically redundant", meaning that the same information is repeated vertically. It is in fact a one-dimensional code. The heights of the bars can be truncated without any loss of information. However, the vertical redundancy allows a symbol with printing defects, such as spots or voids, to still be read. The higher the bar heights, the more probability that at least one path along the bar code will be readable. A two-dimensional (2D) code stores information along the height as well as the length of the symbol. Initially, two-dimensional symbologies were developed for applications where only a small amount of space was available for an automatic ID symbol. There are well over 20 different 2-D symbologies available today.

Another bar code symbology is three dimensional (3D) bar code. One type of 3D bar code is Bumpy Bar code (BBC) available from Mecco Partners LLC of Ingomar, Pa. BBC is any linear bar code symbology that has been marked on material to be read without the use of contrast. Typically bar codes are read by readers that detect the difference between the bars and the background by the amount of visual contrast (or black and white difference) between them. Bumpy Bar Codes are those marks that are created to utilize their relief or "bumpy" aspect to determine where the bars and spaces reside within the code. This technology allows a mark with zero-contrast (white bars and white spaces or black bars and black spaces) to be read without paint, ink or special lighting.

Although the Bumpy Bar Code reader can read traditional contrast labels, the patented geometry of the reader enables it to detect bumpy bar codes via their inherent "3-D" relief characteristics without the use of optical contrast. The reader illuminates the bar code from straight on while a CCD imager looks up at the bar code from a position offset from the laser. This offset geometric induces a form of static parallax ("the apparent difference in position of one object relative to another, caused by a change in observational position that provides a new line of sight") enabling the imager to detect the laser line "riding" over the bumps of the mark.

SUMMARY

In one aspect, systems and methods are disclosed for identifying a mass-customized part by encoding a part identification into a multi-dimensional bar code; and using a stereolithography apparatus (SLA) to make the part with multi-dimensional bar code embedded therein.

Advantages of the system may include one or more of the following. In this embodiment, the bar code information allows automated fabrication and handling of articles or parts. The articles thus incorporate a compact, highly reliable bar code that was capable of both alpha and numeric symbols to automate the production process. The 3D Data Matrix bar code is based on an industry standard solution so that it can be applied cost effectively and read reliably with vision cameras. Other benefits of achieving this technology within the SLA build include: no secondary unique part identification is required saving time, equipment, labor and errors; SLA molds can be placed directly into automated manufacturing processes using standard industry vision and software; automated material handling and work flow management systems can be used to control the production processes; and data matrix standards were maintained to assure compatibility with the industry. Since the part is identified during every stage of manufacturing, data such as work-in-progress information of the articles or parts can be used to effectively estimate the reliability and improve the manufacturability of the article. By allowing automated manufacturing, the article and part information can be used to eliminate labor and reduce cost.

BRIEF DESCRIPTION OF THE DRAWINGS

In the drawings, which illustrate embodiments of the present invention and are not intended to be limiting.

DETAILED DESCRIPTION

Although hereinbelow are described what are at present considered the preferred embodiments of the invention, it will be understood that the invention can be embodied in other specific forms without departing from the spirit or essential characteristics thereof. The present embodiments are, therefore, to be considered in all aspects as illustrative and not restrictive. Accordingly, the invention is limited solely by the claims appended hereto.

Figure 1:
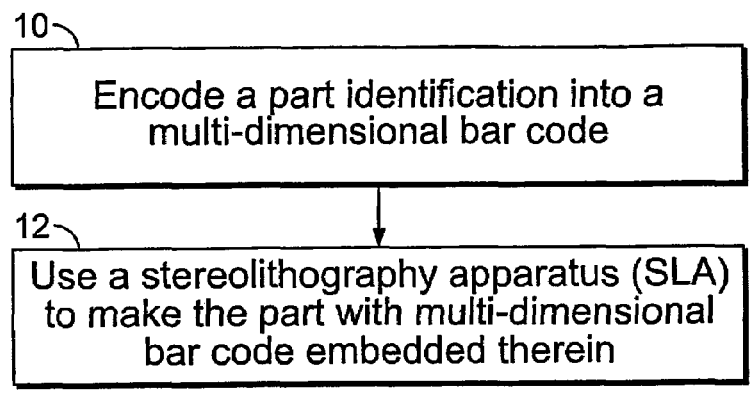
FIG. 1 shows an exemplary process for making a part with a 3D bar code.

Turning now to the drawings, in which similar reference characters denote similar elements throughout several views, FIG. 1 shows an exemplary process for forming a 3D bar code on a part. The process first encodes a part identification into a multi-dimensional bar code (10); and uses a stereolithography apparatus (SLA) to make the part with multi-dimensional bar code embedded therein (12).

Bar code encoder software is used to convert the part identification data into an image of a bar code suitable for SLA printing. The basic structure of a bar code consists of a leading and trailing quiet zone, a start pattern, one or more data characters, optionally one or two check characters and a stop pattern. In one embodiment, an encoder for a Data Matrix from Acuity CiMatrix is used. The Data Matrix is a 2-D matrix code designed to pack volumes of information in a very small space. A Data Matrix symbol can store between one and 500 characters. The symbol is also scalable between a 1-mil square to a 14-inch square. The code has several other interesting features. Since the information is encoded by absolute dot position rather relative dot position, it is not as susceptible to printing defects as is traditional bar coding. The coding scheme has a high level of redundancy with the data "scattered" throughout the symbol. This allows the symbol to be read correctly even if part of it is missing. Each Datacode symbol has two adjacent sides printed as solid bars, while the remaining adjacent sides are printed as a series of equally spaced square dots. These patterns are used to indicate both orientation and printing density of the symbol.

Two main subsets of Datamatrix symbols exist. Those using convolutional coding for error correction are referenced as ECC-000 to ECC-140. The second subset is referenced ECC-200 and uses Reed-Solomon error correction techniques. ECC-000 to 140 symbols have an odd number of modules along each square side. ECC-200 symbols have an even number of modules on each side. Maximum data capacity of an ECC-200 symbol is 3116 numeric digits, or 2335 alpha numeric characters, in a symbol 144 modules square. More information about Data Matrix code is available in the following U.S. Pat. Nos. 4,939,354; 5,053,609; 5,124,536, the content of which is incorporated by reference.

In one embodiment, after rendering a 2D bitmap image of the bar code, the system renders a 3D image of the bar code by elevating each pixel of the Data Matrix to a predetermined height. Next, the system merges the 3D data describing the part with the 3D data of the bar code. The result is a composite 3D data set that describes the part with the bar code suitable for fabrication using mass customization machinery such as stereolithography apparatuses (SLAs). One supplier of SLA equipment is 3D Systems, Inc. of Valencia, Calif. Their system is discussed in U.S. Pat. No. 5,885,511. As discussed therein, the apparatus for forming a solid three-dimensional article from a liquid medium capable of solidification when subjected to prescribed energy are known in the prior art. For example, as discussed in the '511 patent, U.S. Pat. No. 4,575,330 to Charles W. Hull discloses a system for generating three-dimensional objects from a liquid medium by irradiating liquid layers with the aid of a computer programmed irradiation source and a translational mechanism.

Stereolithography is a method that employs an ultraviolet laser to cure a thin layer of liquid plastic into a solid. The process operates by taking a thin layer of the light-sensitive liquid plastic and passing the laser beam over the points where the part is solid. Once a pass is completed, another layer of the liquid is added to the existing part, and the process repeats until the full part height is achieved. SLA parts are extremely accurate, and tend to have excellent surface finishes. A variety of SLA materials are available for different purposes, including waxes, plastics, and flexible elastomers. Typically, an SLA process may produce some 20-25 molds in an hour.

In one embodiment, the parts with the 3D bar codes made using the SLA process are constructed from a liquid photopolymer that is selectively cured using an ultraviolet laser. The process mathematically slices the composite 3D data set that describes the part with the bar code into 2D cross sections. With a build apparatus positioned just below the surface of the photopolymer, a scanning system is used to draw the first cross section on the surface of the photopolymer, which adheres to the apparatus.

When the layer is complete, an elevator assembly lowers the apparatus into the vat and the next layer is drawn, with each new layer adhering to the previous one. The process repeats itself until the object is completed. Typically, a mechanical blade is used to sweep the surface of the photopolymer to ensure an even layer of resin for the next layer.

After the three-dimensional part with the 3D bar code has been formed, the elevator is raised and the object is removed from the apparatus. Typically, the object is then ultrasonically rinsed in a solvent, such as acetone, that dissolves the liquid state of the uncured fluid medium and not the cured solid state medium. The part is then placed under an intense ultraviolet floodlight, typically a 200 watt per inch UV cure lamp, to complete the curing process. The result is an SLA fabricated part with a 3D bar code embedded therein.

The 3D code is read by CCD video camera or CCD scanner. Symbols between one-eight inch square to seven inches square can be read at distances ranging from contact to 36 inches away. Typical reading rates are 5 symbols per second. The detected 3D bar code can be used to track a part through a manufacturing process or any part of the chain of commerce such as check-out counters.

In one exemplary manufacturing system, a dental "aligner", for application to a patient's teeth, is made from an SLA mold with the embedded 3D bar code for mold identification. A series of aligners is constructed which are sequentially applied by the patient to their teeth and which result over time in beneficial changes to the patient's dental structure. The initial mold is made from an impression of the patient's teeth and the subsequent molds and aligners are made using software and a digitization of the initial mold. The mold can be made using rapid prototyping techniques.

Producing a dental mold with rapid prototyping methods requires the use of a computerized model or digital data set representing the dental geometry and tooth configuration. The model is used to guide the mold making process to produce a replica or relief of the computerized model. The resulting relief is a three-dimensional mold of the dentition. This method of making dental molds is particularly applicable to situations in which multiple molds must be produced. In this case, one computerized model may be used to make a number of molds in an automated fashion. In addition, this method is applicable to situations in which a mold of a tooth arrangement that differs from the patient's current tooth arrangement is needed to be produced or molds of multiple tooth arrangements that differ from each other and the patient need to be produced. In either case, the computerized model of the patient's teeth may be manipulated to portray each new tooth arrangement and a mold may be produced to reflect each successive arrangement. This may be repeated any number of times to derive a number of molds with differing tooth arrangements. Such techniques may speed production time and reduce costs by eliminating the need for repeated casting and artistic resetting of teeth in traditional mold manufacturing.

Series of dental molds, such as those described above, may be used in the generation of elastic repositioning appliances for a new type of orthodontic treatment being developed by Align Technology, Inc., Santa Clara, Calif., assignee of the present application. Such appliances are generated by thermoforming a thin sheet of elastic material over a mold of a desired tooth arrangement to form a shell.

The shell of the desired tooth arrangement generally conforms to a patient's teeth but is slightly out of alignment with the initial tooth configuration. Placement of the elastic positioner over the teeth applies controlled forces in specific locations to gradually move the teeth into the desired configuration. Repetition of this process with successive appliances comprising new configurations eventually moves the teeth through a series of intermediate configurations to a final desired configuration. For example, a new appliance with a slightly different configuration may be worn for 20 days before replacement with the next appliance in the sequence. A full description of an exemplary elastic polymeric positioning appliance is described in U.S. Pat. No. 5,975,893, and in published PCT application WO 98/58596 which designates the United States and which is assigned to the assignee of the present invention. Both documents are incorporated by reference for all purposes.

Figure 2:
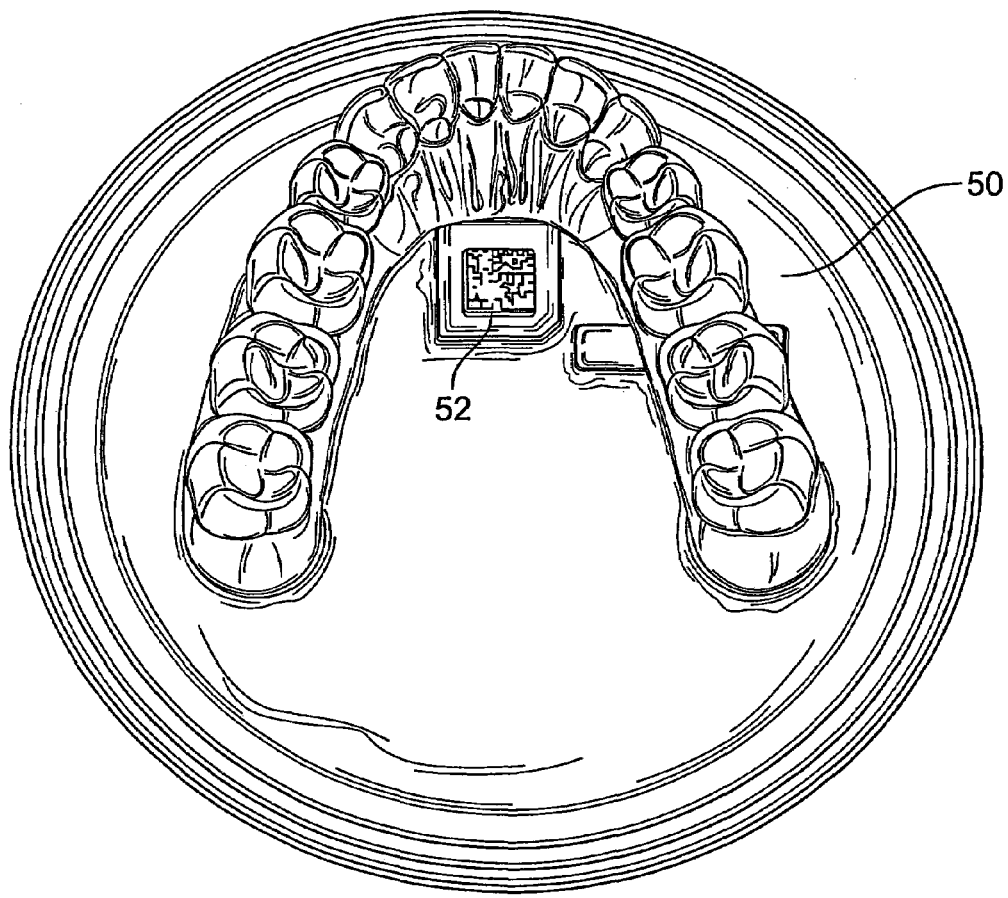
FIG. 2 shows an exemplary dental mold with a 3D bar code.

In one implementation, an apparatus for fabricating a mass-customized appliance includes a web feeder; a load station coupled to the web feeder to receive a mold; and a forming station coupled to the load station to generate the appliance. A programmable logic controller (PLC) is used to control the forming station. The PLC controls electrical and pneumatic I/O for the web feeder, heat zone, rotary SLA feed, forming, machine vision and die cutting functions. The PLC stores and retrieves multiple recipes to perform its tasks. The PLC communicates over a network to allow real time monitoring of production throughput, preventive maintenance, and remote diagnostics management. The web feeder provides an in and out-feed to a piercing chain to provide safe rapid recovery from both machine malfunctions and roll change out. A heater provides a heat zone over the web feeder. The heat zone further comprises a plurality of in-line individually controlled modular ceramic heaters. The load station comprises an opposing dual platform to allow continuous rotary introduction of unique molds to web without interruption to the process. The load station allows simultaneous loading of the next mold during the forming process. The forming station allows continuous introduction and removal of new unique mold to be thermoformed at each cycle. The forming station further comprises a pressure/vacuum chamber, wherein the pressure/vacuum chamber is first sealed on the web to allow pre-forming. The mold is introduced to the pre-formed web and simultaneously, vacuum and pressure are applied to form the material on the mold. The material is blown in a first direction over the mold and then blown in an opposite direction to deposit over the mold. Each mold is formed with an elevated 3D data matrix code containing unique identification of the mold. A machine vision module performs a data acquisition from a multi-dimensional matrix code and reports it to a laser marking system. The vision module comprises a camera and a light ring set up vertically over the station. The chamber is opened the load platform is withdrawn and the mold is retained in the web and transferred to the machine vision module. The laser marker is a diode pump laser with marking head, standard marking and targeting software and laser parameters. The PLC and PC controller provide HMI safety access and the laser system meets CDRH certification by manufacturer. FIG. 2 shows one such exemplary mold 50 with the elevated 3D data matrix code 52.

In one embodiment, an integrated thermo-former and laser marker design supports mass customization manufacturing of dental appliances. The system includes in-line integration of: Incremental Web precision feed and speed control; multiple heat zone control and closed loop monitoring capable of ramping material to forming temperature; and continuous feed rotary SLA mold introduction to the web forming process. The thermoform process incorporates the web, unique mold every cycle, pre-forming web, pressure and vacuum forming and mold retention in the web. A machine vision acquires data that identifies each unit and communicates the data to the laser marker. The laser marker retrieves unit ID data over a network and performs automated targeting of a marking zone. A die cutter automatically removes a predetermined area of usable web and discharges the unit to an automated material handling equipment. A take-up spool is used to manage waste material.

In one embodiment, a programmable logic controller (PLC) manages electrical and pneumatic I/O for the web feed, heat zone, rotary SLA feed, forming, machine vision and die cutting functions. The PLC can store and retrieve multiple recipes. The PLC also communicates using network connectivity to allow real time monitoring of production throughput, preventive maintenance, remote diagnostics management and downtime.

In one aspect, the web feed is capable of handling a pliant material such as plastic. The web feed interacts with a payout device that controls environmental and static control to meet the requirements for the material. An in-and-out feed provides a piercing chain mechanism to provide a rapid roll change out.

In another embodiment, in-line individually controlled modular ceramic heaters are used in the heat zone. Ceramic heaters with controlled zones are used to achieve required cycle times. An opposing dual platform load station allows continuous rotary introduction of unique molds to web without interruption to the process. This will allow simultaneous loading of the next mold during the forming process. The forming station allows continuous introduction and removal of new unique mold to be thermoformed at each cycle. The pressure/vacuum chamber is first sealed on the web allowing pre-forming to occur. The mold is then introduced to the pre-formed web and simultaneously the vacuum and pressure are applied to form the material on the mold. As the chamber is opened the load platform is withdrawn and the mold is retained in the web and transferred to the machine vision station.

Every unit, in this case a stereolithography apparatus (SLA) mold, is built with an elevated 2D data matrix code containing unique identification. The elevated 2D data matrix code is thus a three dimensional bar code. In one embodiment, the elevation is uniform. In another embodiment, the data matrix can be variably elevated so that the elevation level can be another dimension to encode data. Machine vision performs a data acquisition from that data matrix code and reports the data to the Laser Marking station. The vision system includes a digital camera and light ring set up vertically over the station. During laser marking, a computer-controlled laser with marking head receives data from the machine vision system. The laser machine interlocks to provide safe access for maintenance, minor repairs or adjustments to equipment. The aligners are then trimmed to remove rough edges that can cut or otherwise affect patient comfort. In one embodiment, the trimming is done using a CNC cutter. The CNC cutter receives the geometry of the aligner and based on the geometry, trims the aligner to better fit the aligner to the patient. The aligner can then be placed in a tumbler to smooth the edges following the trimming operation so that the aligner can be comfortably worn.

Next, the aligners are packed and trays and labels are applied to the packages. The resulting packages are then shipped to customers. Typically the appliances are to be worn in a particular sequence to provide desired treatment, such as a progressive movement of teeth through a variety of arrangements to a final desired arrangement. In one embodiment, a system of dental appliances is provided comprising a plurality of dental appliances wherein at least some of the plurality include a non-numeric indicia designating an order in which each of the at least some of the plurality are to be worn by a patient to provide dental treatment. Typically, each of the plurality of dental appliances comprise a polymeric shell having cavities shaped to receive and resiliently reposition teeth from one arrangement to a successive arrangement. In some embodiments, each of the polymeric shells has at least one terminal tooth cavity and the indicia comprises a terminal tooth cavity of differing length in each of the polymeric shells. In other embodiments, each of the polymeric shells has a height and the indicia comprises a different height in each of the polymeric shells. In still other embodiments, the indicia comprises one or more cutouts so that each polymeric shell has a different cutout pattern. Sometimes the cutout comprises a notch in an edge of the appliance. In yet other embodiments, the indicia comprises a color wherein each appliance has different color. The color of the appliances may have the same hue and vary by intensity, for example. The color may comprise a dissolvable dye. Or, the system may further comprise a wrapper removably attachable to each of the appliances, wherein each wrapper has the color. In another embodiment, a system of packaged dental appliances is provided comprising a plurality of packages each containing a dental appliance, wherein the plurality of packages are joined in a continuous chain designating an order in which each of the dental appliances are to be worn by a patient to provide dental treatment. In some instances, the packages are each joined by a perforation wherein the packages can be separated by breaking the perforation. In other instances, the packages are joined by, for example, a heat seal. Further, the system may include a marking on a package at an end of the chain indicating the dental appliance to be worn first. Again, each of the plurality of dental appliances may comprise a polymeric shell having cavities shaped to receive and resiliently reposition teeth from one arrangement to a successive arrangement. In yet other embodiments, a system of dental appliances is provided comprising a plurality of dental appliances to be worn by a patient to provide dental treatment, and a framework, wherein each of the plurality of dental appliances are removably attached to a portion of the framework. In some embodiments, each of the plurality of dental appliances comprises a polymeric shell having cavities shaped to receive and resiliently reposition teeth from one arrangement to a successive arrangement. Further, the system may comprise at least one marking on the framework indicating the order in which the appliances are to be worn by a patient. In still another embodiment, a plurality of packages are produced wherein each of the packages includes a polymeric shell having cavities shaped to receive and resiliently reposition teeth from one arrangement to a successive arrangement, the plurality of packages including a first package containing a first shell to be worn by the patient to reposition the teeth from the one arrangement to the successive arrangement and a second package containing a second shell to be worn by the patient to reposition the teeth from a successive arrangement to another successive arrangement. The first package can be provided to the patient at a designated time through a remote delivery system, and delivering the second package to the patient at a later designated time through the remote delivery system. In most embodiments, the remote delivery system comprises a mail delivery system.

Figure 3:
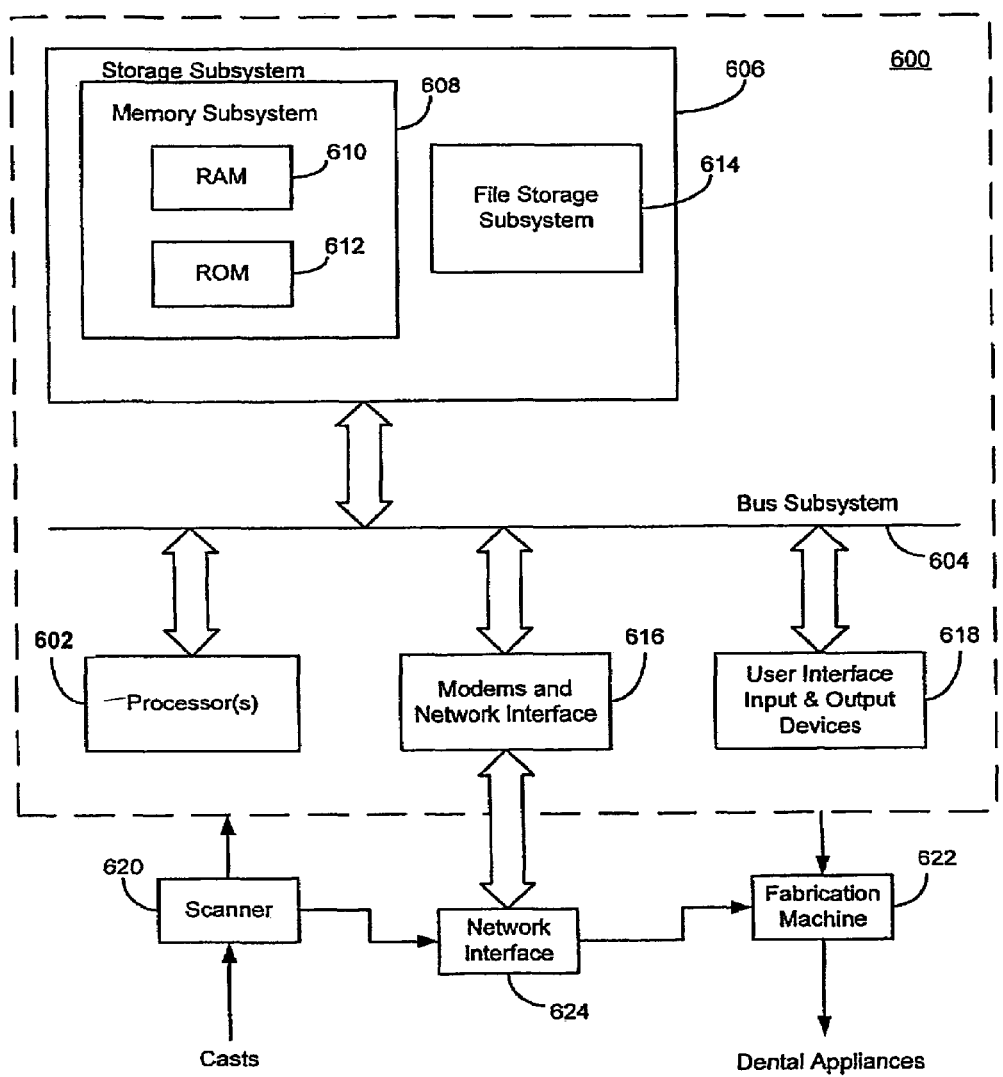
FIG. 3 shows an exemplary system for mass-customizing parts.

FIG. 3 is a simplified block diagram of a data processing system 600 that may be used to generate a 3D structure such as a dental model or a dental appliance directly. The data processing system 600 typically includes at least one processor 602 that communicates with a number of peripheral devices via bus subsystem 604. These peripheral devices typically include a storage subsystem 606 (memory subsystem 608 and file storage subsystem 614), a set of user interface input and output devices 618, and an interface to outside networks 616, including the public switched telephone network. This interface is shown schematically as "Modems and Network Interface" block 616, and is coupled to corresponding interface devices in other data processing systems via communication network interface 624. Data processing system 600 could be a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touch screen incorporated into the display, or a three dimensional pointing device, such as the gyroscopic pointing device described in U.S. Pat. No. 5,440,326. Other types of user interface input devices, such as voice recognition systems, can also be used. User interface output devices typically include a printer and a display subsystem, which includes a display controller and a display device coupled to the controller. The display device may be a cathode ray tube (CRT), a flat-panel device such as a liquid crystal display (LCD), or a projection device. The display subsystem may also provide non-visual display such as audio output.

Storage subsystem 606 maintains the basic required programming and data constructs. The program modules discussed above are typically stored in storage subsystem 606. Storage subsystem 606 typically comprises memory subsystem 608 and file storage subsystem 614.

Memory subsystem 608 typically includes a number of memories including a main random access memory (RAM) 610 for storage of instructions and data during program execution and a read only memory (ROM) 612 in which fixed instructions are stored. In the case of Macintosh-compatible personal computers the ROM would include portions of the operating system; in the case of IBM-compatible personal computers, this would include the BIOS (basic input/output system). File storage subsystem 614 provides persistent (non-volatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by SyQuest and others, and flexible disk cartridges, such as those marketed by Iomega. One or more of the drives may be located at a remote location, such as in a server on a local area network or at a site on the Internet's World Wide Web. In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that personal computers and workstations typically will be used. Bus subsystem 604 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 620 is responsible for scanning casts of the patient's teeth obtained either from the patient or from an orthodontist and providing the scanned digital data set information to data processing system 600 for further processing. In a distributed environment, scanner 620 may be located at a remote location and communicate scanned digital data set information to data processing system 600 via network interface 624. Fabrication machine 622 fabricates dental appliances based on intermediate and final data set information received from data processing system 600. In a distributed environment, fabrication machine 622 may be located at a remote location and receive data set information from data processing system 600 via network interface 624. More information on the fabrication of dental appliances is discussed in U.S. Pat. No. 5,975,893 entitled "Method and system for incrementally moving teeth", the content of which is hereby incorporated by reference.

The information needed to drive the fabrication machine 622 can originate from an intraoral scanner, a destructive scanner, or a non-destructive scanner. In one embodiment, the non-destructive scanner is a CT scanner. In this embodiment, an apparatus to create a digital model of a patient's teeth includes a radiation source; a scintillator to receive the radiation from the radiation source; a radiation detector coupled to the scintillator; a rotatable table positioned between the radiation source and the scintillator, the table being adapted to support an impression of the patient's teeth; and a computer coupled to the detector to generate the digital model with scanned data. A fabrication machine can be driven by the computer to generate a plurality of appliances, wherein the appliances comprise polymeric shells having cavities and wherein the cavities of successive shells have different geometries shaped to receive and resiliently reposition the teeth from one arrangement to a successive arrangement. Such systems are described in U.S. Pat. Nos. 6,633,789; 6,629,840; 6,626,666; 6,621,491; 6,607,382; 6,602,070; 6,582,229; 6,582,227; 6,572,372; 6,554,611; 6,524,101; 6,514,074; 6,499,997; 6,497,574; 6,488,499; 6,485,298; 6,471,511; 6,463,344; 6,457,972; 6,454,565; 6,450,807; 6,409,504; 6,406,292; 6,398,548; 6,394,801; 6,390,812; 6,386,878; 6,386,864; 6,371,761; 6,318,994; 6,309,215; 6,299,440; 6,227,851; 6,227,850; 6,217,325; 6,210,162; 5,975,893, the contents of which are hereby incorporated by reference.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language. Each such computer program can be stored on a storage medium or device (e.g., CD ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

The manner of usage and operation of the invention described above being readily apparent from the above disclosure, no further discussion relative to the manner of usage and operation of the invention shall be provided. With respect to the above description, it is to be understood that the optimum dimensional relationships for the parts of the invention, as well as variations in size, materials, shape, form, function, and manner of operation, assembly, and use, and equivalents of all the foregoing, are apparent to one skilled in the art. Such equivalents are intended to be encompassed by the present invention. Therefore, the foregoing is considered as illustrative only of the principles of the invention. Further, since numerous modifications and changes will be readily apparent to those skilled in the art, it is not intended to limit the invention to the exact construction and operation shown and described, but to encompass all suitable modifications and equivalents within the scope of the invention. The scope of the invention is indicated by the appended claims rather than by the foregoing description.

What is claimed is:

1. A method for making a series of aligners for a patient's teeth, the method comprising:
   providing a series of positive molds, each having a three-dimensional bar code;
   putting the series of positive molds in an order based on information included in their respective three-dimensional bar codes; and
   forming the series of aligners over the series of positive molds.

2. The method of claim 1, wherein providing the series of positive molds comprises using a stereolithography machine to form the positive molds.

3. The method of claim 2, wherein using the stereolithography machine comprises building multiple layers of each three-dimensional bar code on each positive mold.

4. The method of claim 1, wherein providing the series of positive molds includes painting the three-dimensional bar code on each of the positive molds.

5. The method of claim 1, comprising illuminating the three-dimensional bar code with a colored light.

6. The method of claim 1, wherein putting the series of positive molds in an order comprises:
   capturing the three-dimensional bar code on each of the series of positive molds using a bar code reader; and
   sorting the series of positive molds based on the order information included in the three dimensional bar code.

7. A method for making a series of aligners for a patient's teeth, the method comprising:
  using a stereolithography machine to form a series of positive molds, each having a unique three-dimensional bar code formed in multiple layers by the stereolithography machine; and
  forming the series of aligners over the series of positive molds.

8. The method of claim 7, further comprising putting the series of positive molds in an order based on information included in the three-dimensional bar codes.

9. The method of claim 8, wherein putting the series of positive molds in an order comprises:
  capturing the three-dimensional bar code on each of the series of positive molds using a bar code reader; and
  sorting the series of positive molds based on the information included in the three dimensional bar code.

10. The method of claim 7, wherein providing the series of positive molds includes painting the three-dimensional bar code on each of the positive molds.

11. The method of claim 7, comprising illuminating the three-dimensional bar code with a colored light.

12. A method for making a series of mass-customized items, the method comprising:
  providing a series of positive molds, each having a unique three-dimensional bar code;
  putting the series of positive molds in an order based on information included in the three-dimensional bar codes; and
  forming the series of mass-customized items over the series of positive molds.

13. The method of claim 12, wherein providing the series of positive molds comprises using a stereolithography machine to form the positive molds.

14. The method of claim 13, wherein using the stereolithography machine comprises building multiple layers of each three-dimensional bar code on each positive mold.

15. The method of claim 12, wherein providing the series of positive molds includes painting the three-dimensional bar code on each of the positive molds.

16. The method of claim 12, comprising illuminating the three-dimensional bar code with a colored light.

17. The method of claim 12, wherein putting the series of positive molds in an order comprises:
  capturing the three-dimensional bar code on each of the series of positive molds using a bar code reader; and
  sorting the series of positive molds based on the information included in the three dimensional bar code.

18. A method for making a series of mass-customized items, the method comprising:
  using mass customization machinery to form a series of positive molds, each having a unique three-dimensional bar code formed by the mass customization machinery;
  putting the series of positive molds in an order based on order information included in the three-dimensional bar codes; and
  forming the series of mass-customized items over the series of positive molds.

19. The method of claim 18, wherein providing the series of positive molds includes painting the three-dimensional bar code on each of the positive molds.

20. The method of claim 18, comprising illuminating the three-dimensional bar code with a colored light.

21. The method of claim 18, wherein putting the series of positive molds in an order comprises:
  capturing the three-dimensional bar code on each of the series of positive molds using a bar code reader; and
  sorting the series of positive molds based on the information included in the three dimensional bar code.

22. A method for making a series of aligners for a patient's teeth, the method comprising:
  providing a series of positive molds, each having a unique three-dimensional bar code;
  forming the series of aligners over the series of positive molds; and
  ordering the molds and their respective aligners using information from the three-dimensional bar codes.

23. A method for making a series of mass-customized items, the method comprising:
  providing a series of positive molds, each having a unique three-dimensional bar code;
  forming the series of mass-customized items over the series of positive molds; and
  ordering the molds and their respective mass-customized items using the three-dimensional bar codes.

* * * * *